INVENTORS.
RUSSELL G. ATTRIDGE, JR.
JOHN C. DONOVAN
CHARLES C. GRIMES

Andrus & Starke
Attorneys

United States Patent Office 3,341,121
Patented Sept. 12, 1967

3,341,121
CONDITION RESPONSIVE CONTROL CIRCUIT AND APPARATUS THEREFOR
Russell G. Attridge, Jr., Milwaukee, and John C. Donovan, Whitefish Bay, Wis., and Charles C. Grimes, Dallas, Tex., assignors to Johnson Service Company, Milwaukee, Wis., a corporation of Wisconsin
Filed Jan. 13, 1965, Ser. No. 425,205
14 Claims. (Cl. 236—74)

ABSTRACT OF THE DISCLOSURE

A temperature sensitive control circuit includes a pair of alternating current bridge circuits with the inputs connected for in-phase energization and the outputs connected in series adding. The one bridge circuit includes a temperature responsive element which responds rapidly to changes in temperature. The other bridge circuit includes a similar temperature responsive element which responds slowly to the same changes in temperature. The two temperature sensitive elements are mounted together and subjected to the same temperature. The net output is therefore equal to the sum of the fast response bridge circuit and the slow response bridge circuit. A fast balancing resistor is connected in the opposite leg of the second bridge circuit to modify the action. Authority adjustment potentiometers are connected across the outputs to control the proportion of the two circuits inserted into the output connected in series.

This invention relates to a condition responsive control circuit and apparatus therefor and particularly to a control circuit for controlling temperatures and the like and having means for compensating or resetting the circuit operation to produce stability of operation while maintaining sensitive and close control.

The present invention is particularly applicable to a proportional temperature control of rooms, processing fluids and the like and is particularly described hereinafter in connection with such application. In its broadest aspect, however, it is applicable to any condition responsive control system where the capacity of the system is in excess of the load change.

In thermostatic control units and the like, it is desirable to provide a rapidly responding control element responsive to the condition being controlled to maintain close regulation or control of the controlled temperature or condition. However, in order to maintain stability of operation, it is desirable to combine therewith a slow acting or integrating control action to compensate for drift of the rapid control with shifting control points. Thus, if the fast acting element does not give the desired or necessary control action, the integrating control gives additional signal and increases the control action.

Generally, control systems employ a feedback signal responsive to the controlled condition. The system includes high gain in order to reduce the magnitude of steady state error or offset about a set point and to provide quick response time in correction for deviations from a set point. However, a desirable gain may inherently result in system instability. In many cases it is practically impossible to select a single gain value providing the necessary stable characteristics with a small deviation or error, and a compensating or reset system should be provided. However, because of the complexity and the initial and maintenance expense in many applications today, an excessive steady state error is accepted in order to obtain the necessary stability.

For example, United States Patent 2,312,671 to Carl A. Otto which issued Mar. 2, 1943, discloses a dual element thermostat providing for different actions, one of which provides the necessary rapid response and the other the delayed response. Similarly, other systems have provided compensated controls by anticipation of load requirements; for example, as shown in the Sargeaunt Patent 2,603,422 wherein the temperature control circuit includes a first member responsive to the controlled temperature and a second set of temperature responsive elements controlled by or responsive to the temperature of the heat source. An automatic compensation or reset system is also disclosed in United States Patent 2,694,169 which issued Nov. 9, 1954, wherein a relatively complicated feedback circuitry is provided with fast and slow response elements inserted into the circuit to provide the desired resetting of the system to modify the proportional control.

The present invention is particularly directed to a simplified and inexpensive control circuit which includes a novel and improved compensating or reset circuit of a relatively simple and inexpensive design.

The present invention generally includes condition sensitive means including two different sections which have distinctly different responses to changes in the condition providing the same general form; one responding very rapidly and the other relatively very slowly. In accordance with the present invention, the two sections are connected in a balancing circuit to produce unbalance signals in the same sense or direction. The rapid response element provides an initial rapid response upon which is superimposed, acting in the same direction, the slow response of the other sections. The particular response curve is determined by the relative control action of each under a static or steady condition and is preferably arranged to provide a fixed total response with adjustment means to inversely vary the proportion of rapid and slow responses. For temperature controls, resistance temperature sensing means can include thermal insulation associated with the one section to provide the different response rates.

In accordance with one form of the present invention, three condition responsive units or elements are provided in the control circuit and all three of the elements are subjected to the condition to be controlled. Two of the condition responsive devices are selected to be rapidly acting units interconnected in the circuit to provide an adjustable proportional control action. This permits setting of the system to produce relatively stable regulation in response to minor or temporary fluctuations in the controlled condition. The third device is selected to have an integral action to provide a substantially fixed reset or compensation control. Thus, in a preferred construction in the present invention, a pair of bridge circuits have their outputs connected in series. Each of the bridges includes one of the rapidly acting elements interconnected to provide opposing outputs. One of the bridges, defined as the compensating or auxiliary bridge, also includes the slow acting element acting in a manner to resist or aid the control established by the rapid acting element in the opposite bridge circuit and opposing the action of the rapid acting element in the same bridge circuit. Additionally, the auxiliary bridge includes adjustable authority means for adjusting the proportion of the output connected in series with the main bridge circlit. The circuit then permits adjustment of the total system such that it will have an output response corresponding to that of the fast element of the main bridge, to the lag or slow element of the auxiliary bridge or to the combination therebetween. Thus, the effective proportion of the response of the elements of the auxiliary bridge inserted into the circuit is determined by the authority setting of the adjustable means which in turn adjusts the proportional response. For example, if the adjustable output is selected to essentially eliminate the second bridge circuit, the system will respond to the fast acting element alone in the first or the main bridge circuit. As the authority adjustment is inserted into the circuit, the action of the fast response device in the first bridge circuit is offset by the proportion of the second bridge or effect of the second fast response device in the auxiliary bridge circuit. At all but the first setting, the slow acting device is inserted as a time integral into the circuit to provide the desired fixed reset action.

In summary, the present invention through the adjustable supplemental or auxiliary bridge provides for an adjustment of the proportional responsive control of the system. The interconnection of the lag element and the fast responsive element in the auxiliary bridge further provides for a fixed reset of the system. In essence, the system provides a thermally responsive analogy to the known resistor-capacitor electrical lag circuit often known as a proportional network with automatic reset wherein the time constant of reset is fixed by a given total resistance but the proportional control is adjustable by varying of the total resistance between the two paths of such a circuit.

An important aspect of the present invention is the fact that all three of the elements are located in a single location. Consequently, it produces a readily constructed sensing element whereby the slow acting element of a temperature sensing element for example can be embedded within a thermal insulating mass and the rapidly acting elements mounted or wound on the outside of this mass. Thus, a small compact unit can be constructed for mounting in a single location in a rapid and ready manner.

The drawings furnished herewith illustrate a preferred construction of the present invention in which the above advantages and features as well as others will be clearly disclosed from the following description and explanation of the drawings.

Figure 1:
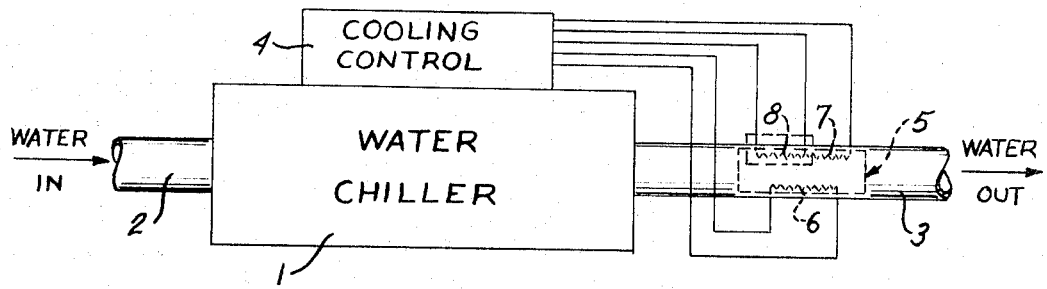
FIG. 1 is a diagrammatic illustration of the present invention incorporated in the control of a water chiller.

Referring to the drawings and particularly to FIG. 1, a water chiller 1 of any well known or suitable construction is shown in block diagram with an appropriate label. The water chiller 1 includes warm water inlet line 2 and a cooled water outlet line 3. Generally, the chiller is constructed such that its cooling capacity is in excess of the demand. However, it does require close regulation of the temperature with varying demand.

Figure 2:
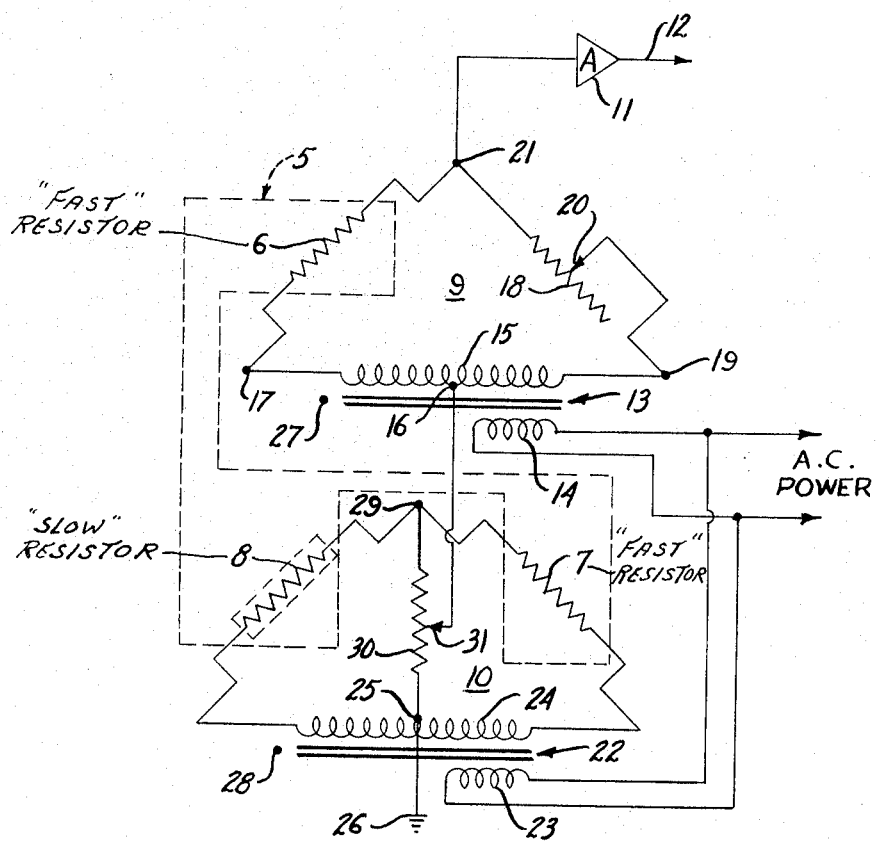
FIG. 2 is a schematic circuit diagram illustrating a preferred "Wheatstone" type bridge control circuit.

In order to provide for the desired control, a sensitive feedback controller 4 controls the operation of the water chiller 1 and includes a sensing unit 5 secured within line 3 to produce an error signal proportional to the cooled water. Generally, in accordance with the present invention as illustrated in FIGS. 1 and 2, the sensing unit 5 includes a fast response and sensing resistor 6, a fast response resistor 7 and a slow response or lag resistor 8 mounted as a single integrated sensing unit 5 and subjected to the corresponding temperature of the water in the outlet line 3. All three elements are subjected to the same temperature condition. Elements or resistors 6 and 7 provide a rapid and proportional variation in their resistance in proportion to any change in the temperature whereas the resistor 8 is selected or constructed to provide a much slower response. The time constant of the slow response element is preferably large and finite with respect to the time constant of the other elements in the control system.

As shown in FIG. 2, the resistors 6 to 8 are respectively connected in circuit with a main bridge circuit 9 and a supplemental or auxiliary bridge circuit 10 having their outputs interconnected in series. The output of the bridge circuits is preferably amplified by an amplifier 11 to increase the level of the error signal at the control line 12 to a suitable operating level.

Generally, in operation, the sensing resistors 6 and 7 are interconnected in the circuit to provide opposite actions with respect to each other such that they will tend to offset any control action with temperature variation. The slow or the lag resistor 8 in turn is connected to aid the action of the one fast response resistor 6 and to oppose the action of the other fast response resistor 7. The percentage action of the resistors 7 and 8 however is selectively controlled as subsequently described such that the overall action of the system can be made to correspond to that of the resistor 6, that of the resistor 8 or a combination of the two as presently described. Generally, the fast response resistors 6 and 7 provide close regulation of the temperature for any change from the set point. Slow response or lag resistor 8 on the other hand provides an integral action to reset or readjust the system to provide a fixed approximate reset or integral control action.

Referring particularly to FIG. 2, the main bridge circuit 9 is illustrated as an alternating Wheatstone type bridge including an input transformer 13 having a primary winding 14 connected to suitable incoming power lines; for example, the usual 60 cycle 110 volt distribution power. A center tapped secondary 15 is magnetically coupled to the primary winding 14 and forms two legs of the bridge circuit 9 with the center tap 16 constituting one of the output terminals. The portion of winding 15 to the left of the tap constitutes a first leg connected at the outer end to the rapid or fast response resistor 6 to form a first input junction 17 and the opposite half to the right of the center tap 16 in FIG. 2 constitutes a second leg connected to a set point rheostat 18 to form a second input junction 19. The set point rheostat 18 includes a movable tap 20 connected to junction 19 to selectively adjust the portion of the rheostat connected in the fourth leg and thereby determine the set point of the main bridge 9. The junction of the resistor 6 and the rheostat 9 constitutes the second output junction or terminal 21 with the output of the bridge 9 being taken between center tap 16 and the output terminal 21. In the illustrated embodiment of the invention, the output terminal 21 is connected as the input to the amplifier 11 and the center tap 16 is connected to the auxiliary bridge 10. In operation, the rheostat 18 will be set in accordance with prior calibration to provide a desired output response with the output of the bridge being nulled at a selected temperature, i.e. the resistance of the rheostat 18 inserted in the circuit and of the resistor 6 will balance the bridge circuit at the selected temperature.

In accordance with the present invention, the output of the bridge 9 is adjustably modified by the selective addition of all or a portion of the output of bridge 10 to produce a net compensated signal to the amplifier 11 and therefore to the operating member, not shown, of controller 4.

The illustrated bridge 10 generally is similar to that of bridge 9 and includes an excitation transformer 22 having a primary winding 23 connected to the power lines in parallel with primary winding 14. The transformer 22 includes a center tapped secondary 24 interconnected in the bridge circuit in the same manner as the secondary 15 and having a center tap 25 constituting one of the output terminals. In the illustrated embodiment of the invention, the center tap 25 is connected to ground 26 to provide a common return for the control circuit. The secondary windings 15 and 24 are wound to provide for correspondingly phased outputs as illustrated by the polarity dots 27 and 28 adjacent the corresponding respective ends of the secondary winding. If desired, a single primary rather than separate primaries 14 and 23 can be coupled to the secondaries 15 and 24.

In the bridge circuit 10, the second or fast response resistor 7 is connected to the right end of the secondary 24 and thus in a leg opposite that of the fast response resistor 6 in the first bridge circuit. The slow response or lag resistor 8 on the other hand is connected into the leg of the bridge 10 corresponding to the leg of bridge 9 including the fast response resistor 6. The junction of resistors 7 and 8 in the bridge 10 constitutes the second output terminal 29.

An authority adjustment potentiometer 30 is connected across the output terminals 25 and 29 of the bridge circuit 10 and includes an adjustable tap 31 connected to the center tap 16 of winding 15 in the main bridge 9. The output of the main bridge 9 is connected in series with a proportion of the output of the bridge 10 in accordance with the setting of the tap 31 with respect to the output terminals 25 and 29.

The amplified error signal appearing at control line 12 is therefore an algebraic summed output which in turn is dependent upon the adjustment of the tap 31 as well as the interaction of the responsive resistors 6, 7 and 8 all of which, as previously noted, are subjected to the same temperature condition. The fast or rapid responsive resistors 6 and 7 tend to nullify each other in that as the output of the main bridge 9 moves in one direction with a temperature change the output of the bridge 10 will move in the opposite direction as a result of the opposite location of the resistors 6 and 7 in the respective bridge. In contrast the slow response or lag resistor 8 is located in the bridge 10 to oppose the corresponding fast response resistor 7 but aids or acts in the same direction as the resistor 6 in bridge 9. As a result, the action of the total system can correspond to that of resistor 6, that of resistor 8 or a combination of the two. For example, if the tap 31 is adjusted and connected to engage the grounded center tap 25 of bridge 10, a zero percentage authority position, the bridge circuit 10 is operatively disconnected from the controller 4 and the error signal is completely and only dependent upon the output of the fast response resistor 6. Consequently, it provides total control with any change in temperature being correspondingly reflected in a proportional output signal. In contrast, when tap 31 is moved to the opposite end of the potentiometer 30, a 100% authority position, the total output of auxiliary bridge 10 is operatively connected in the controller. The fast response resistors 6 and 7 are both connected in the respective bridge circuits 9 and 10, are both subjected to precisely the same temperature condition and consequently, due to the opposite action with respect to the output, will nullify each other for all temperature changes. This leaves the slow response or lag resistor 8 as the only effective element in the circuit to generate an error signal. It provides an output control corresponding to its integral control action.

When the tap 31 is positioned at any intermediate point, however, the proportion of the offset between resistors 6 and 7 is varied and the insertion of resistor 8 is correspondingly varied to provide the desired intermediate action.

Figure 3:
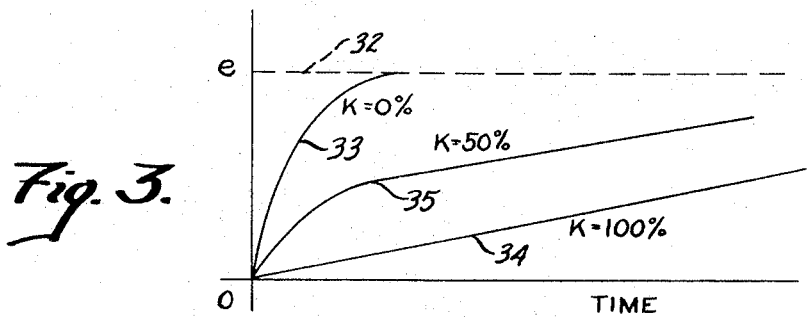
FIG. 3 shows typical response curves of the system shown in FIG. 2.

This action may be visualized perhaps more clearly in FIG. 3 which illustrates the error signal appearing at the control line 12 for various percentage authority settings, identified by the capital letter K, of the tap 31 with respect to time. The voltage or error signal is shown on the vertical axis and time is shown on a horizontal axis. The horizontal dotted line 32 corresponds to a stepped input in temperature variation which is sensed by the resistors 6, 7 and 8. With tap 31 at the zero percentage authority position engaging the grounded center tap 25, the output voltage would theoretically move directly in accordance with the error. As a practical matter, the curve rapidly rises along the curve 33 as a result of the inherent time delay in any condition responsive element. With the potentiometer tap 31 at the 100% authority position, the output characteristic is equal to the characteristic of the lag element which as previously noted is a thermal integration in close approximation and the output voltage will therefore rise as a curve 34, shown idealized as a straight line. At an intermediate position of tap 31; for example, 50% authority, the response curve 35 is positioned intermediate curves 33 and 34. The action of the system thus corresponds to an adjustable proportional action controlled by the interaction of the fast response resistors 6 and 7 in combination with a fixed reset action provided by the slow response or lag resistor 8. Comparing the present system to its electrical analog for purposes of explanation, the time constant would correspond to the product of the capacitance times the sum of the two resistances of the electrical analog. The authority adjustment of the present invention would vary the relative division of the resistances in the circuit while maintaining their sum at a constant.

For example, it may be desired to maintain the water as close to freezing as possible without any real danger of complete freezeup within the water chiller with the resulting great damage. As water freezes at approximately 32°, normally a 4° margin of safety will be provided. Consequently, the minimum temperature which the system should be set up for would be 36°. The design may therefore provide for a water chiller having an output at 38°, plus and minus 2° deviation. The present invention can be readily applied to maintain such a condition with the response selected in accordance with anticipated load changes and the like.

The illustrated system is limited to a selected maximum total signal, as shown by dashed line 32 in FIG. 3, which is set by the response of one of the sensitive elements under a steady state condition. The maximum signal is selected to a suitable practical value without danger of damaging the control apparatus and to provide maximum utilization of the system.

Figure 4:
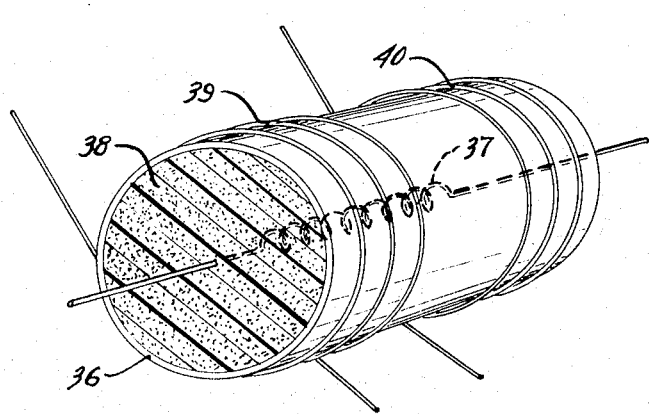
FIG. 4 is a diagrammatic illustration of a preferred construction of the sensing element or unit of the present invention.

Although the response elements can be formed and mounted in any desired manner, they are preferably formed as a single integrated unit; for example, as diagrammatically shown in FIG. 4. As shown therein, a tubular housing 36 is provided with a lag resistance coil 37 embedded within a mass of thermal insulation 38 substantially filling the housing 36. Fast response resistance coils 39 and 40 may be wound on the exterior surface of the housing 36 such that the total unit can be inserted into the condition responsive load to provide the desired action. The elements 39 and 40 are subjected directly to the controlled temperature whereas the lag element 37 is subjected to the controlled temperature after it has moved through the thermal insulation 38.

Figure 5:
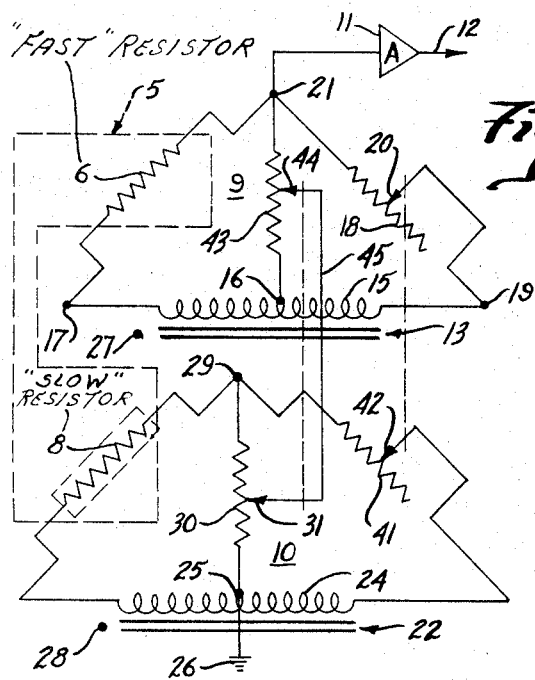
FIGURE 5 is a schematic circuit diagram illustrating an alternative means of carrying out the invention employing one fast element and one slow element.
Figure 6:
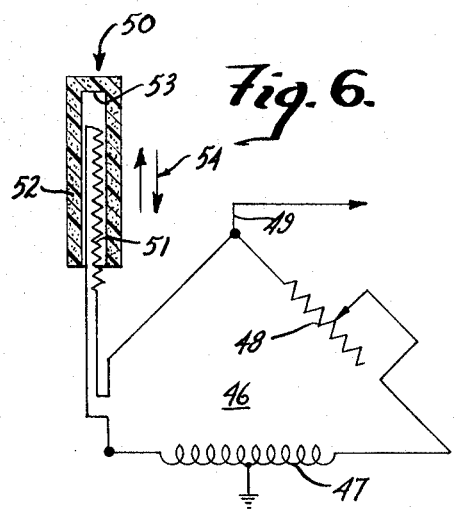
FIG. 6 is a view of a third circuit for carrying out the invention with a single element employing an adjustably positioned thermal insulator.

The present invention may also be carried out as schematically shown in FIGS. 5 and 6. The circuits of FIGS. 5 and 6 were conceived by and are, in the particulars, the subject of less than all of the inventors herein and are set forth to clearly illustrate the broad scope of this invention. More particularly, the circuit of FIG. 6 is the joint invention of Russell G. Attridge, Jr. and John C. Donovan and the circuit of FIG. 5 is the sole invention of John C. Donovan and may be covered by continuing applications by the inventors. Corresponding elements in the embodiments of FIGS. 2 and 5 are similarly numbered for simplicity and clarity of explanation.

The system of FIG. 5 also employs a pair of bridge circuits 9 and 10 energized by transformer secondaries 15 and 24, the associated primaries of which are not shown in FIG. 5.

In the circuit of FIG. 5, the fast element 6 and the slow element 8 are employed. The fast element 7 of FIG. 2 is replaced with a second set point rheostat 41 corresponding to the set point rheostat 18. Rheostat 41 includes an adjustable tap 42 ganged with the corresponding tap 20 of rheostat 18 to cause simultaneous and similar null adjustment of the two bridge circuits. Additionally, in the modified system, a potentiometer 43 is connected across the output terminals 16 and 21 of the bridge 9 with an adjustable tap 44 connected to the tap 31. The connection of tap 31 to the terminal 16 in FIG. 2 is eliminated. Taps 31 and 44 are ganged to provide for similar and simultaneous positioning of the two taps such that the output of the bridges 9 and 10 are inversely inserted in the output circuit. The total effective temperature sensitive means is fixed to that of the element 6 or 8, as in the prior embodiment.

The operation of the circuit shown in FIG. 5 is as follows. The set point rheostats 18 and 41 are adjusted to provide a null output with the fast and slow elements 6 and 8 at a selected null temperature. This adjustment can be made independently of the setting of the taps 31 and 44 and therefore before or after such adjustment. The taps 31 and 44 are adjusted simultaneously to provide the desired percentage authority or response of the respective elements in the circuit. With the taps 31 and 44 set at the lowermost end of the respective potentiometers, tap 31 is connected directly to terminal 25 and thus to ground 26 and the bridge circuit 10 is operatively removed from the circuit. Simultaneously, the tap 44 is connected to the output terminal 16 which in turn is connected through tap 31 to ground 26 and the complete voltage signal generated across potentiometer 43 of the bridge circuit 9 constitutes the error signal. This error voltage signal is generated by the rapid response element 6 and consequently provides a rapid response curve corresponding to the fast response of element 6.

When the potentiometer taps 31 and 44 are moved to the opposite or the 100% authority position on the other hand, the tap 44 is connected directly to terminal 21 and consequently the fast response bridge 9 is operably disconnected from the circuit. On the other hand, the tap 31 is connected to the upper end of the potentiometer 30 and the complete output signal appearing thereacross will be reflected as an error signal at the output line. The response of the system will therefore be that of the slow response element 8.

As the potentiometers 30 and 43 are adjusted to an intermediate authority position by an intermediate positioning of taps 31 and 44, a portion of the output of the bridge 9 is inserted in the circuit and a corresponding portion of the output of the bridge 10 is eliminated from the output circuit. Thus, as tap 31 is moved down from the 100% authority position, a corresponding proportion of the output voltage generated across the potentiometer 30 appears at tap 31 and is connected in series with the output signal at tap 44. The positioning of the tap 44 of potentiometer 43 has eliminated a corresponding percentage of the output signal appearing across the potentiometer 43. In response to temperature deviations, the output voltage generated across the element 43 follows very rapidly such deviation. The slow acting element 8 provides an integrated action producing an output voltage across the element 30 which is the integral of the deviation with time. The circuit of FIG. 5 therefore produces the same adjustable control as FIG. 2; i.e., an adjustable proportional control with a fixed reset.

A further means for carrying out the present invention is shown in FIG. 6 which discloses a single bridge circuit 46 providing a control generally corresponding to that of the previous embodiments.

In FIG. 6, the single bridge circuit 46 includes an input transformer having a center tap secondary 47 forming a pair of bridge legs in the same manner as in the previous embodiment. A set point rheostat 48 is shown forming the third leg between the center tapped secondary 47 and an output lead 49. The fourth bridge leg is formed by an adjustable temperature responsive assembly 50 particularly providing the proportional action with the fixed reset. The assembly 50 includes a temperature sensitive resistance coil or element 51 connected as the fourth leg of the bridge circuit between line 49 and the proper side of the secondary 47. A thermal insulating housing 52 is provided with a central opening 53 adapted to be adjustably telescoped over the element 51. The housing 52 can be moved in either direction as shown diagrammatically by the pair of oppositely directed arrows 54.

In operation, assembly 50 is subjected to the temperature condition to be controlled. The portion of the element 51 projecting within the opening 53 and enclosed by housing 52 is insulated. It will therefore provide an integrated control action for deviation of the temperature conditions being controlled. In contrast, the portion of element 51 projecting from housing 52 is directly exposed to the temperature condition and provides a fast response or action. Consequently, the total action of assembly 50 and output of the circuit 46 can be made to vary substantially between the action of element 51 as a totally enclosed unit providing complete integral action and a totally exposed unit providing a rapid response action. As in the prior illustrations, the steady state output conditions are identical for all settings of the housing 52, as the whole of element 51 is subjected to the same final steady condition to provide a corresponding maximum output.

The present invention provides a continuously adjustable proportional control having an essentially fixed reset action. The circuitry and elements of the present invention constitute a relatively simple and inexpensive means for feedback type controls which combine stability with sensitive and close control for all load and set point changes.

Various modes of carrying out the invention are contemplated as being within the scope of the following claims particularly pointing out and distinctly claiming the subject matter which is regarded as the invention.

We claim:
1. A condition responsive controller, comprising
   at least three condition sensitive means having characteristics proportional to the sensed condition and two of which are rapid response means having a substantially shorter time constant than the other one which is a relatively slow response means,
   means to mount said sensitive means to be subjected to essentially a single condition which tends to vary and to correspondingly vary the characteristics of the means with changes in the sensed condition, and
   means connecting said means in a control circuit to provide an adjustable proportional control action wherein the two rapid response means are connected in opposition and the slow response means is connected to aid the one rapid response means to provide a fixed reset of the response position of the two elements having the relatively short time constant.

2. A condition responsive control for generating a composite signal which varies as a function of a single changeable condition, comprising
   first and second signal sources each of which changes substantially and similarly in proportion to changes in the value of said condition,
   a third signal source which changes substantially in proportion to changes in the value of said condition, the rate of change of said third signal source being substantially less than that of the first and second source, and
   circuit means connecting said signal sources whereby the first and second sources act in opposition to each other and said third signal source acts in addition to the first of said sources and in opposition to the second of said sources.

3. A condition responsive control for generating a composite signal which varies as a function of a single changeable condition, comprising first and second signal sources each of which changes substantially and similarly in proportion to changes in the value of said condition, a third signal source which changes substantially in proportion to changes in the value of said condition, the rate of change of said third signal source being substantially less than that of the first and second source, circuit means connecting said signal sources whereby the first and second sources act in opposition to each other and said third signal source acts in addition to the first of said sources and in opposition to the second of said sources, and adjustable means forming a part of the circuit means to simultaneously vary the proportionate effect of the second and the third signal sources.

4. A temperature controller for generating a composite signal which varies as a function of a sensed temperature condition, comprising first, second and third temperature sensitive means each of which has an impedance proportional to the temperature thereof, means to mount said sensitive means to sense said sensed temperature condition and arranged such that the rate of change of said third sensitive means is substantially less than that of the first and second source, and circuit means connecting said sensitive means whereby the first and second sensitive means act in opposition to each other and said third sensitive means acts in addition to the first of said sensitive means and in opposition to the second of said sensitive means.

5. The temperature controller of claim 4 having adjustable means forming a part of the circuit means to simultaneously vary the proportionate effect of the second and the third sensitive means.

6. The temperature controller of claim 4 wherein said temperature sensitive means include similar elements with the third element embedded in a body of thermal insulation and the others of which are secured to the exterior surface of said body.

7. An adjustable compensated condition controlling apparatus, comprising first and second condition sensitive means selected to vary rapidly with condition variations, a third condition sensitive means selected to vary slowly with temperature variations, means to mount said means in the same environment and subjected to identical conditions, a first balancing circuit having said first condition sensitive means in one leg and an adjustable set point means in a different leg and having output terminal means, a second balancing circuit having said second condition sensitive means and said third condition sensitive means in opposing legs tending to maintain said bridge between a set of output terminal means, an adjustable means connected across the output terminal means of said second balancing circuit, and an output circuit connecting the output terminal means of the first balancing circuit in series with a selected portion of the second balancing circuit whereby the rate of action of the apparatus is first modified by the selected portion and providing a fixed reset action.

8. An adjustable compensated temperature controlling apparatus, comprising first and second temperature sensitive resistors selected to vary rapidly with temperature variations, a third temperature sensitive resistor selected to vary slowly with temperature variations, means to mount said resistors in the same environment and subjected to identical temperature conditions, a first bridge circuit having said first resistor in one leg and an adjustable set point resistor in an opposite leg and having output terminal means, a second bridge circuit having said second resistor and said third resistor in opposite legs tending to maintain said bridge in balance, an adjustable means connected across the output of said second bridge circuit to provide an adjustable proportionate output, and an output circuit connecting the output terminal means of the first bridge in series with the adjustable means whereby the rate of action of the apparatus is responsive to the setting of the tap.

9. An adjustable compensated temperature controlling apparatus, comprising first and second temperature sensitive resistors selected to vary rapidly with temperature variations, a third temperature sensitive resistor selected to vary slowly with temperature variations, means to mount said resistors in the same environment and subjected to identical temperature conditions, a first bridge circuit having an alternating current input means and having said first resistor in one leg and an adjustable set point resistor in an opposite leg and having output terminal means, a second bridge circuit having a corresponding alternating current input and having said second resistor and said third resistor in opposite legs tending to maintain said bridge in balance, a potentiometer connected across the output of said second bridge circuit and having a movable output tap, and an output circuit connecting the output terminal means of the first bridge in series with the tap whereby the rate of action of the apparatus is responsive to the setting of the tap.

10. A temperature controller producing a compensated signal, comprising a first and a second balancing circuit each having a plurality of corresponding legs with input terminals and output junctions, a first temperature sensitive element forming a leg of the first balancing circuit, a set point rheostat forming a different leg of the first balancing circuit, a second temperature sensitive element forming a leg of the second balancing circuit and having a substantially slower response than the first temperature sensitive element, a third temperature sensitive element forming a leg of the second balancing circuit and having a response substantially corresponding to the second temperature sensitive element, an adjustable means connected across the output terminals of the second balancing circuit, and means connected to the output terminals of the first balancing circuit and the adjustable means of the second balancing circuit to provide an output signal adjustable between the rate action of the first temperature sensitive element and the second temperature sensitive element.

11. A temperature controller producing a compensated signal, comprising a first and a second bridge circuit each having four corresponding legs with first opposed junctions constituting alternating current input terminals and the second opposed junctions constituting alternating current output junctions and each having a center tapped transformer secondary forming the first and second legs of the corresponding bridge circuit with the center tap thereof as one of the output terminals, a first temperature sensitive element forming a third leg of the first bridge circuit, a set point rheostat forming a fourth leg of the first bridge circuit, a second temperature sensitive element forming a third leg of the second bridge circuit and having a substantially slower response than the first temperature sensitive element, a third temperature sensitive element forming a fourth leg of the second bridge circuit and having a response substantially corresponding to the first temperature sensitive element, a potentiometer connected across the output terminals of the second bridge circuit and having an adjustable output tap, and means connected to the output terminals of the first bridge circuit and the potentiometer of the second bridge circuit to provide an output signal adjustable between the rate action of the first temperature sensitive element and the second temperature sensitive element.

12. A condition responsive controller for regulating discharge water of a water chiller and the like, comprising a power input to the water chiller to adjust the cooling of the water passing therethrough, said chiller having a capacity substantially in excess of the demand, first and second temperature sensitive elements mounted in the output line and rapidly responding to changes in the temperature of the water, a third temperature sensitive element mounted in the output line and responding relatively slowly to changes in the temperature of the water, and circuit means connecting said elements in a control circuit having an output error signal corresponding to the response of the first of the elements modified by an opposing action of the second of the elements and aiding action of the third of the elements.

13. A temperature responsive controller, comprising a first and second bridge circuit, each having four corresponding interconnected legs with first opposed junctions of the legs constituting the alternating current input terminals and second opposed junctions of the legs constituting alternating current output junctions, each having a center tapped transformer secondary forming the first and second legs of the corresponding bridge circuit with the center tap thereof as one of the output terminals, a first temperature sensitive impedance element connected in and forming a third leg of the first bridge circuit, a second temperature sensitive impedance element connected in and forming the same third leg of the second bridge circuit and having a substantially slower response than the first temperature sensitive element, the output signal appearing at the output terminals being in phase and varying in the same direction in response to corresponding changes in the impedances of the elements, an adjustable impedance means connected across the output terminals of the first balancing circuit, an adjustable impedance means connected across the output terminals of the second balancing circuit, and an output circuit having the adjustable means of the first and second bridge circuits connected in series to provide an output signal equal to the sum of the two bridge circuits, said adjustable means being inversely positioned for adjusting the output signal between the rate action of the first temperature sensitive element and the second temperature sensitive element.

14. The temperature responsive controller of claim 13 having a set point rheostat forming a fourth leg of the first bridge circuit, a set point rheostat forming the same fourth leg of the second bridge circuit, and means to simultaneously and correspondingly position the set point rheostats.

References Cited

UNITED STATES PATENTS

| | | | |
|---|---|---|---|
| 853,505 | 5/1907 | Eddy | 62—208 |
| 1,332,182 | 2/1920 | Leeds | 236—70 X |
| 1,356,804 | 10/1920 | Brewer. | |
| 1,643,582 | 9/1927 | Martin. | |
| 2,312,671 | 3/1943 | Otto | 236—87 X |
| 2,488,580 | 11/1949 | Burleigh | 219—500 X |
| 2,620,136 | 12/1952 | Levine | 236—78 |
| 2,826,072 | 3/1958 | Kliever | 323—69 X |
| 3,021,474 | 2/1962 | Byloff. | |
| 3,204,423 | 9/1965 | Resh | 62—209 |
| 3,211,975 | 10/1965 | Burley. | |

MEYER PERLIN, Primary Examiner.

ALDEN D. STEWART, ROBERT A. O'LEARY, Examiners.

W. E. WAYNER, Assistant Examiner.

UNITED STATES PATENT OFFICE
CERTIFICATE OF CORRECTION

Patent No. 3,341,121                 September 12, 1967

Russell G. Attridge, Jr., et al.

It is hereby certified that error appears in the above numbered patent requiring correction and that the said Letters Patent should read as corrected below.

Column 9, line 62, after "bridge" insert -- in balance --.

Signed and sealed this 22nd day of October 1968.

(SEAL)
Attest:

Edward M. Fletcher, Jr.

Attesting Officer

EDWARD J. BRENNER

Commissioner of Patents